United States Patent [19]

Vitellaro et al.

[11] Patent Number: 4,541,832

[45] Date of Patent: Sep. 17, 1985

[54] PROCESS FOR PRODUCING HIGH PURITY SODIUM CHLORIDE FROM POTASSIUM MINERAL FLOTATION TAILINGS

[75] Inventors: Antonio Vitellaro; Giovanni Sanfilippo, both of Palermo, Italy

[73] Assignee: Italkali Societa Italiana Sali Alcalini S.p.A., Palermo, Italy

[21] Appl. No.: 492,679

[22] Filed: May 9, 1983

[30] Foreign Application Priority Data

May 11, 1982 [IT] Italy ............................... 21187 A/82

[51] Int. Cl.$^4$ ........................... C01D 3/08; C01D 3/14
[52] U.S. Cl. ..................................................... 23/303
[58] Field of Search ............. 23/293 R, 295 R, 302 R, 23/303; 209/2, 10, 12, 166

[56] References Cited

U.S. PATENT DOCUMENTS 3,904,520 9/1975 Dancy ............................... 23/302 R

OTHER PUBLICATIONS

Stoffel, P. A., "Washing, Dewatering and Drying Salt," *Third Symposium on Salt*, Northern Ohio Geological Society Inc., 1970, pp. 3–9, (vol. 2).

*Primary Examiner*—Richard V. Fisher
*Assistant Examiner*—W. Gary Jones
*Attorney, Agent, or Firm*—Morgan, Finnegan, Pine, Foley & Lee

[57] ABSTRACT

The invention relates to a process for recovering from potassium mineral flotation tailings sodium chloride of sufficiently high purity to make it suitable for industrial use, characterized by comprising the following stages:
(a) washing said flotation tailings with water and with the mother liquor from one or more successive stages of the process, said mother liquor containing sodium chloride as undissolved bottoms, to give a mixture of a solid phase comprising nearly all the sodium chloride contained in said fed tailings, and a liquid phase
(b) separating said mixture into a first turbid portion enriched in said solid phase, and a second turbid portion enriched in said liquid phase
(c) separating the solid phase from the liquid phase of said first turbid portion, this latter separated phase constituting at least part of said mother liquor for use in stage (a), and possibly
(d) drying the solid phase separated in stage (c) to produce high purity sodium chloride.

3 Claims, 1 Drawing Figure

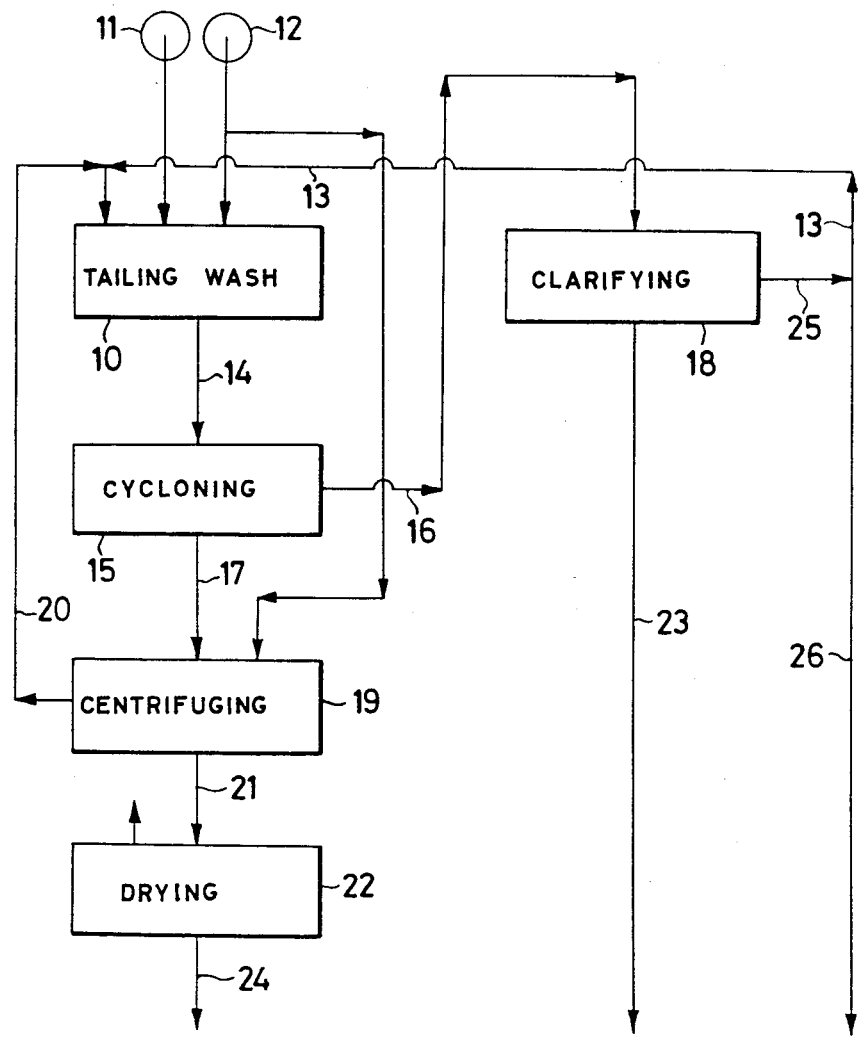

PROCESS FOR PRODUCING HIGH PURITY SODIUM CHLORIDE FROM POTASSIUM MINERAL FLOTATION TAILINGS

In nature, all potassium-containing materials normally also contain more or less large quantities of sodium chloride and inerts such as kainite, schoenite, sylvite, kieserite, anhydrite, clay etc. Before the potassium minerals can be used industrially, both the sodium chloride and the inerts must be removed. In this respect, the known art generally uses a flotation separation process, with which by treating the suitably ground mineral mixture with an appropriate collector it is possible to obtain a product enriched in potassium mineral, and a residue, known as the floating tailings, which contains nearly all the sodium chloride, the inerts and a small quantity of potassium mineral.

Up to the present time, the sodium chloride obtained as flotation tailings has found no industrial use because of the minerals and flotation mother liquor which accompany it, these making it unsuitable for subsequent conversion processes, for which a NaCl purity of at least 99.4% is required.

The general tendency has therefore been to discard the sodium chloride of the flotation tailings as an undesirable by-product. This means that the tailings have to be treated before discharge, because to dispose of them as such would lead to ecological damage.

It is apparent that the need to purify the effluent results in further costs for the industry of this sector.

The object of the present invention is therefore to enable the sodium chloride contained in the flotation tailings arising from the potassium mineral processing industry to be used for industrial purposes, and thus to recover it from the tailings at sufficiently high purity, i.e. greater than at least 99%. This object according to the invention must be attained in an essentially simple and direct manner in order for it to be economically advantageous. It must also result in a high yield and minimise the quantity of effluent liquids in play.

These objects are attained according to the invention by a process for recovering from potassium mineral flotation tailings sodium chloride of sufficiently high purity to make it suitable for industrial use, characterised by comprising the following stages:

(a) washing said flotation tailings with water and with the mother liquor from one or more successive stages of the process said mother liquor containing sodium chloride as undissolved bottoms, to give a mixture of a solid phase comprising nearly all the sodium chloride contained in said fed tailings, and a liquid phase (b) separating said mixture into a first turbid portion enriched in said solid phase, and a second turbid portion enriched in said liquid phase (c) separating the solid phase from the liquid phase of said first turbid portion, this latter separated phase constituting at least part of said mother liquor for use in said stage (a).

The process as heretofore substantially defined can advantageously comprise the following further stages:

(d) drying the solid phase separated in stage (c), (e) separating from said second turbid portion produced in stage (b) at least a part of the liquid phase, this latter thus separated constituting mother liquor for use in stage (a).

The characteristics and advantages of the process according to the invention will be more apparent from the detailed description given hereinafter with reference to the accompanying drawing, of which the single FIGURE shows a block diagram in which each block represents one stage of the process.

With reference to said FIGURE, the process generally comprises the combination and succession of the following stages:

(a) In a first stage 10, flotation tailings 11 are attacked by water 12, and by mother liquor 13 and 20 originating from successive stages 18 and 19, so as to put a small quantity of sodium chloride, the potassium minerals, the anhydrite and the kieserite into solution. In this manner, a mixture 14 of a solid phase comprising sodium chloride and mother liquor is obtained.

(b) In a second stage 15, the solid-liquid mixture 14 is cycloned to remove the greatest possible quantity of mother liquor containing all the insolubles and the finest fractions of the salts present, to obtain in this manner a substantially liquid phase 16 which passes to stage 18, and a solid-liquid mixture 17.

(c) In a third stage 19, the solid of the solid-liquid mixture 17 is separated from its liquid by centrifuging, to give a liquid 20 which is returned to stage 10, and a solid 21 which, after washing with water of the same centrifuge, passes to the next stage.

(d) In a fourth stage 22, the solid 21 is heated to remove all the water contained therein. In this manner, sodium chloride 24 containing 99.60% of NaCl is obtained, this constituting the useful product.

(e) The mother liquor 16 from stage 15 is fed to stage 18, where it is contained in a decanter in which the solids separate out. A clear mother liquor is obtained, of which a part 13 is fed to stage 10, and the remainder 26 is discarded. The solids 23 which separate on to the base of the decanter are removed together with part of the mother liquor. The process heretofore described is illustrated hereinafter with reference to a non-limiting quantitative example:

EXAMPLE 100 t/h of flotation tailings of the following composition: sodium chloride 79.5%, kainite 8.3%, schoenite 1.7%, sylvite 0.5%, anhydrite 0.3%, kieserite 1.2%, magnesium chloride 1.3%, clay 0.3%, water 6.9% enter stage (a) as heretofore defined where they are reacted with 40 t/h of water and 198.8 t/h of mother liquor of the following composition: $MgCl_2$ 1.2%, $MgSO_4$ 8.6%, KCl 5.1%, NaCl 17.6%, $H_2O$ 67.5%, to obtain in this manner 67 t/h of solid of the following composition: sodium chloride 99.6%, anhydrite 0.1%, kieserite 0.1%, sylvite 0.1%, clay 0.1%, and 271.8 t/h of liquid of the following composition: $MgCl_2$ 1.2%, $MgSO_4$ 8.6%, KCl 5.1%, NaCl 17.6%, $H_2O$ 67.5%, which pass to stage (b). In stage (b), cycloning is carried out to partly separate the solid from the liquid, to obtain in this manner 130 t/h of a turbid portion comprising 60 t/h of solid and 70 t/h of liquid (of the same composition as described in stage (a)) which passes to stage (c), and 208.8 t/h of a turbid portion comprising 7.1 t/h of solid and 201.7 t/h of liquid, which passes to stage (e).

In stage (c), centrifuging is carried out to separate the solid from the liquid, and the solid is washed with 3.8 t/h of water to obtain in this manner 63.8 t/h of solid of the following composition: sodium chloride 93.6%, anhydrite 0.1%, kieserite 0.1%, sylvite 0.1%, clay 0.1%, $H_2O$ 6%, which passes to stage (d), and 70 t/h of liquid of the following composition: $MgCl_2$ 1.2%, $MgSO_4$ 8.6%, KCl 5.1%, NaCl 17.6%, $H_2O$ 67.5% which returns to stage (a).

In stage (d), the solid from stage (c) is dried to obtain in this manner 3.8 t/h of water, which is removed in the form of steam, and 60.0 t/h of solid of the following composition: sodium chloride 99.6%, anhydrite 0.1%, kieserite 0.1%, sylvite 0.1%, clay 0.1%, which constitutes the useful product.

In stage (e), the turbid portion from stage (b) is clarified to obtain in this manner: (1) 191 t/h of liquid of the following composition: $MgCl_2$ 1.2%, $MgSO_4$ 8.6%, KCl 5.1%, NaCl 17.6%, $H_2O$ 67.5%, of which 128.8 t/h returns to stage (a) and 62.2 t/h are discarded; (2) 17.8 t/h of sludge comprising 17.1 t/h of solid of the following composition: sodium chloride 93.9%, clay 4.1%, miscellaneous 2.0%, and 10.7 t/h of liquid of the following composition: $MgCl_2$ 1.2%, $MgSO_4$ 8.6%, KCl 5.1%, NaCl 17.6%, $H_2O$ 67.5%, which are discarded.

From this example and from the aforegoing description it is apparent that the invention effectively attains the initially proposed objects. The sodium chloride recovered in this manner can be used either as such or can be treated in order to further increase its purity.

We claim:

1. A process for recovering sodium chloride of sufficiently high purity to make it suitable for industrial use from potassium mineral flotation tailings which consist essentially of sodium chloride, inert materials and potassium mineral, comprising:

(a) washing said mineral flotation tailings with a sufficient amount of both a first stream comprising water and a second stream comprising a mother liquor from one or more successive process steps to give a mixture of a solid phase and a liquid phase, the solid phase consisting essentially of sodium chloride and containing nearly all of the sodium chloride contained in said mineral flotation tailings, said mother liquor comprising a solution containing undissolved sodium chloride;

(b) separating the mixture obtained in step (a) into a first turbid portion enriched in said solid phase, and a second turbid portion enriched in said liquid phase; and (c) separating the solid phase from the liquid phase of said first turbid portion obtained in step (b) and recycling the resulting liquid phase to said second stream in step (a).

2. The process of claim 1 further comprising the step of (d) drying the solid phase obtained in step (c).

3. The process of claim 1 further comprising the step of (e) separating the second turbid portion obtained in step (b) into a solid and a liquid phase and recycling the resulting liquid phase to said second stream in step (a).

* * * * *